United States Patent
Lee et al.

(10) Patent No.: US 11,842,260 B2
(45) Date of Patent: Dec. 12, 2023

(54) INCREMENTAL AND DECENTRALIZED MODEL PRUNING IN FEDERATED MACHINE LEARNING

(71) Applicant: International Business Machines Corporation, Armonk, NY (US)

(72) Inventors: Wei-Han Lee, White Plains, NY (US); Changchang Liu, White Plains, NY (US); Shiqiang Wang, White Plains, NY (US); Bong Jun Ko, Harrington Park, NJ (US); Yuang Jiang, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 17/031,930

(22) Filed: Sep. 25, 2020

(65) Prior Publication Data

US 2022/0101175 A1  Mar. 31, 2022

(51) Int. Cl.
*G06N 3/045* (2023.01)
*G06N 3/082* (2023.01)
*G06N 20/00* (2019.01)

(52) U.S. Cl.
CPC ............. *G06N 3/045* (2023.01); *G06N 3/082* (2013.01); *G06N 20/00* (2019.01)

(58) Field of Classification Search
None
See application file for complete search history.

(56) References Cited

U.S. PATENT DOCUMENTS

2018/0114114 A1* 4/2018 Molchanov ............ G06N 3/045
2018/0268284 A1* 9/2018 Ren .......................... G06N 3/04
(Continued)

FOREIGN PATENT DOCUMENTS

CN    109348707 A    2/2019
CN    109635936 A    4/2019
(Continued)

OTHER PUBLICATIONS

Srivastava et al., "Dropout: A Simple Way to Prevent Neural Networks from Overfitting," 2014, Journal of Machine Learning Research 15 (2014) 1929-1958 (Year: 2014).*
(Continued)

*Primary Examiner* — Abdullah Al Kawsar
*Assistant Examiner* — Asher H. Jablon
(74) *Attorney, Agent, or Firm* — Edward P. Li

(57) ABSTRACT

A computer-implemented method, a computer program product, and a computer system for incremental and decentralized pruning of a machine learning model in federated learning. A federated learning system determines a serial sequence of participating in model pruning by agents in the federated learning system. A server in the federated learning system sends, to a first agent in the serial sequence, an initial model to trigger a federated pruning process for the machine learning model. The each of agents in the serial sequence prunes the machine learning model. The each of agents in the serial sequence generates an intermediately pruned model for an immediately next agent to prune. A final agent in the serial sequence prunes the machine learning model and generates a finally pruned model. The final agent sends the finally pruned model to the server.

20 Claims, 6 Drawing Sheets

(56) References Cited

U.S. PATENT DOCUMENTS

| | | | | |
|---|---|---|---|---|
| 2019/0213470 A1* | 7/2019 | Schmidt | .................. | G06N 3/084 |
| 2019/0251444 A1* | 8/2019 | Alakuijala | ............. | G06N 3/082 |
| 2019/0311220 A1 | 10/2019 | Hazard | | |
| 2019/0318268 A1 | 10/2019 | Wang | | |
| 2020/0125968 A1 | 4/2020 | Hazard | | |
| 2021/0166156 A1* | 6/2021 | Dai | ........................ | G06N 3/063 |
| 2023/0036702 A1* | 2/2023 | Reisser | .................. | G06N 3/045 |

FOREIGN PATENT DOCUMENTS

| | | | |
|---|---|---|---|
| CN | 110490738 A | | 11/2019 |
| CN | 110572253 A | | 12/2019 |
| CN | 110674528 A | | 1/2020 |

OTHER PUBLICATIONS

Jiang et al., "Model Pruning Enables Efficient Federated Learning on Edge Devices", arXiv:1909.12326v3 [cs.LG], Jan. 15, 2020, 21 pages.

Konečný et al., "Federated Learning: Strategies for Improving Communication Efficiency", arXiv:1610.05492v1 [cs.LG], Oct. 18, 2016, 5 pages.

Mell et al., "The NIST Definition of Cloud Computing", National Institute of Standards and Technology, Special Publication 800-145, Sep. 2011, 7 pages.

Molchanov et al., "Pruning Convolutional Neural Networks for Resource Efficient Transfer Learning", arXiv:1611.06440v1 [cs.LG], Nov. 19, 2016, 5 pages.

* cited by examiner

INCREMENTAL AND DECENTRALIZED MODEL PRUNING IN FEDERATED MACHINE LEARNING

This invention was made with government support under W911NF-16-3-0001 awarded by Army Research Office (ARO). The government has certain rights to this invention.

BACKGROUND

The present invention relates generally to federated machine learning, and more particularly to incremental and decentralized pruning of a machine learning model in federated machine learning.

Federated machine learning, since its inception, has attracted considerable attention due to its capability of distributed model training using data collected by possibly a large number of agents (e.g., edge and mobile devices). Federated machine learning aims to allocate a complicated learning process onto multiple agents, especially when agents are reluctant to share their local data to a central server considering limited communication resources and data privacy issues. The federated learning procedure includes local computations at agents and model parameter exchange among agents and a server in an iterative manner. The significance of this procedure is that the agents' data remains local and is not shared with other agents, which preserves data privacy and is more resource-efficient than transmitting all the data to a central server.

Deep neural networks (DNNs) can contain hundreds of millions of parameters. Training such large models directly on agents is often infeasible due to limitations of resources (such as memory) or is very slow. In addition, the communication of such a large number of parameters between agents and a server is also a major impediment in federated learning, since the agent are often geo-distributed devices that need to upload their local models to a server frequently.

Approaches to reducing the communication overhead in federated learning have been proposed; for example, Konečný et al. in "Federated Learning: Strategies for Improving Communication Efficiency" (arXiv: 1610.05492v1, 2016) proposes a method of reducing the uplink communication cost. However, the approaches do not reduce the complexity of local computation at clients. A model pruning technique has been developed by Molchanov et al. in "Pruning convolutional neural networks for resource efficient inference" (arXiv:1611.06440v1, 2016), where the model is trained and pruned at the server with centrally available data, then deployed at the edge for efficient inference. Molchanov's method is applied in the federated learning setting where data are decentralized in clients. In "Model Pruning Enables Efficient Federated Learning on Edge Devices" (arXiv:1909.12326v3, 2020), Jiang et al. has proposed a centralized model pruning at a server in a setting of federated machine learning; in this method, model pruning is implemented at a central server instead of agents.

SUMMARY

In one aspect, a computer-implemented method for incremental and decentralized pruning of a machine learning model in federated learning is provided. The computer-implemented method includes determining, by a federated learning system, a serial sequence of participating in model pruning by agents in the federated learning system. The computer-implemented method further includes sending, by a server in the federated learning system, to a first agent in the serial sequence, an initial model to trigger a federated pruning process for the machine learning model. The computer-implemented method further includes pruning, by the first agent, the initial model. The computer-implemented method further includes pruning, by each of ones after the first agent in the serial sequence, a model that has been pruned by an immediately previous agent. The computer-implemented method further includes generating, by each of ones prior to a final agent in the serial sequence, an intermediately pruned model for an immediately next agent to prune. The computer-implemented method further includes generating, by the final agent, a finally pruned model. The computer-implemented method further includes sending to the server, by the final agent, the finally pruned model.

The computer-implemented method further includes determining, by the server, whether further model pruning is needed. The computer-implemented method further includes deploying, by the server, the finally pruned model on the agents, in response to determining that the further model pruning is not needed. The computer-implemented method further includes setting, by the server, the finally pruned model as a new initial model for another cycle of the federated pruning process, in response to determining that the further model pruning is needed.

In one embodiment of the computer-implemented method, for a peer-to-peer architecture, the computer-implemented method further includes sending, by each of the ones prior to the final agent, to the immediately next agent, the intermediately pruned model for the immediately next agent to prune. In another embodiment of the computer-implemented method, for a server-client architecture, the computer-implemented method further includes sending to the server, by each of the ones prior to the final agent, the intermediately pruned model for the immediately next agent to prune. The computer-implemented method further includes sending to the immediately next agent, by the server, the intermediately pruned model.

In one embodiment of the computer-implemented method, the serial sequence of participating in model pruning by the agents is determined by the server, based on information shared between the server and each of the agents. In another embodiment of the computer-implemented method, the serial sequence of participating in model pruning by the agents is determined by the agents through a consensus protocol, based on information shared among the agents.

In another aspect, a computer program product for incremental and decentralized pruning of a machine learning model in federated learning is provided. The computer program product comprises a computer readable storage medium having program instructions embodied therewith, and the program instructions are executable by one or more processors. The program instructions are executable to determine, by a federated learning system, a serial sequence of participating in model pruning by agents in the federated learning system; send, by a server in the federated learning system, to a first agent in the serial sequence, an initial model to trigger a federated pruning process for the machine learning model; prune, by the first agent, the initial model; prune, by each of ones after the first agent in the serial sequence, a model that has been pruned by an immediately previous agent; generate, by each of ones prior to a final agent in the serial sequence, an intermediately pruned model for an immediately next agent to prune; generate, by the final agent, a finally pruned model; and send, by the final agent, to the server, the finally pruned model.

For the computer program product, the program instructions are further executable to determine, by the server, whether further model pruning is needed; deploy, by the server, the finally pruned model on the agents, in response to determining that the further model pruning is not needed; and set, by the server, the finally pruned model as a new initial model for another cycle of the federated pruning process, in response to determining that the further model pruning is needed.

In one embodiment of the computer program product, for a peer-to-peer architecture, the program instructions are further executable to send, by each of the ones prior to the final agent, to the immediately next agent, the intermediately pruned model for the immediately next agent to prune. In another embodiment of the computer program product, for a server-client architecture, the program instructions are further executable to send to the server, by each of the ones prior to the final agent, the intermediately pruned model for the immediately next agent to prune; and send to the immediately next agent, by the server, the intermediately pruned model.

In one embodiment of the computer program product, the serial sequence of participating in model pruning by the agents is determined by the server, based on information shared between the server and each of the agents. In another embodiment of the computer program product, the serial sequence of participating in model pruning by the agents is determined by the agents through a consensus protocol, based on information shared among the agents.

In yet another aspect, a computer system for incremental and decentralized pruning of a machine learning model in federated learning is provided. The computer system comprises one or more processors, one or more computer readable tangible storage devices, and program instructions stored on at least one of the one or more computer readable tangible storage devices for execution by at least one of the one or more processors. The program instructions are executable to determine, by a federated learning system, a serial sequence of participating in model pruning by agents in the federated learning system. The program instructions are further executable to send, by a server in the federated learning system, to a first agent in the serial sequence, an initial model to trigger a federated pruning process for the machine learning model. The program instructions are further executable to prune, by the first agent, the initial model. The program instructions are further executable to prune, by each of ones after the first agent in the serial sequence, a model that has been pruned by an immediately previous agent. The program instructions are further executable to generate, by each of ones prior to a final agent in the serial sequence, an intermediately pruned model for an immediately next agent to prune. The program instructions are further executable to generate, by the final agent, a finally pruned model; and send, by the final agent, to the server, the finally pruned model.

For the computer system, the program instructions are further executable to determine, by the server, whether further model pruning is needed. The program instructions are further executable to deploy, by the server, the finally pruned model on the agents, in response to determining that the further model pruning is not needed. The program instructions are further executable to set, by the server, the finally pruned model as a new initial model for another cycle of the federated pruning process, in response to determining that the further model pruning is needed.

In one embodiment of the computer system, for a peer-to-peer architecture, the program instructions are further executable to send, by each of the ones prior to the final agent, to the immediately next agent, the intermediately pruned model for the immediately next agent to prune. In another embodiment of the computer system, for a server-client architecture, the program instructions are further executable to send to the server, by each of the ones prior to the final agent, the intermediately pruned model for the immediately next agent to prune. The program instructions are further executable to send to the immediately next agent, by the server, the intermediately pruned model.

In one embodiment of the computer system, the serial sequence of participating in model pruning by the agents is determined by the server, based on information shared between the server and each of the agents. In another embodiment of the computer system, the serial sequence of participating in model pruning by the agents is determined by the agents through a consensus protocol, based on information shared among the agents.

DETAILED DESCRIPTION

Embodiments of the present invention disclose incremental and decentralized model pruning in federated machine learning. The incremental and decentralized model pruning proposed in the present invention is a secure model pruning technique to prune a deep leaning model in federated machine learning, because the incremental and decentralized model pruning does not require data sharing from agents; therefore, the incremental and decentralized model pruning achieves a good trade off among model size (efficiency and feasibility), accuracy of training a machine learning model, and data security of agents.

Figure 1:
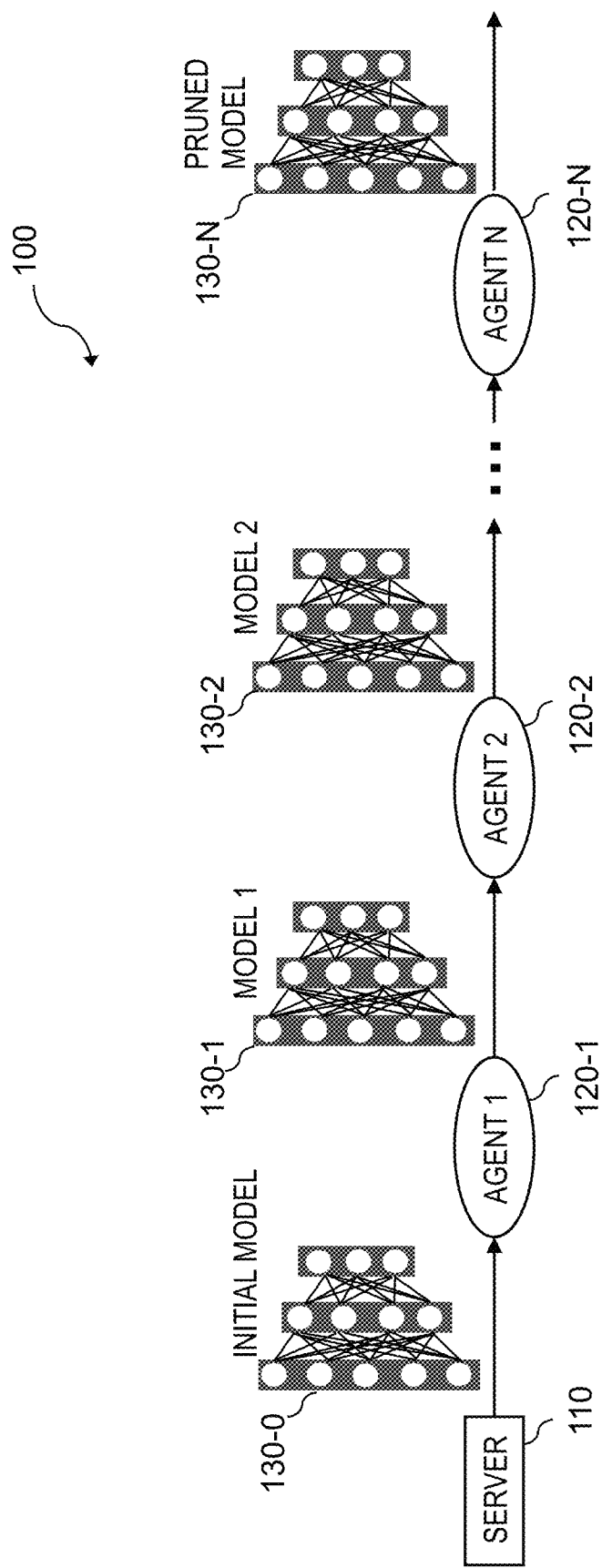
FIG. 1 is a systematic diagram illustrating a peer-to-peer architecture of incremental and decentralized pruning of a machine learning model in federated machine learning, in accordance with one embodiment of the present invention.

FIG. 1 is a systematic diagram illustrating a peer-to-peer architecture 100 of incremental and decentralized pruning of a machine learning model in federated machine learning, in accordance with one embodiment of the present invention. The peer-to-peer architecture 100 includes a server 110 in an environment of federated machine learning. The peer-to-peer architecture 100 further includes N agents (agent 1 120-1, agent 2 120-2, . . . , and agent N 120-N). For example, the agents are edge and mobile devices. The N agents are in a serial sequence of participating in model pruning by agents in a federated learning system. In the environment of federated machine learning, the server 110 sends an initial model 130-0 to agent 1 120-1 to start the federated pruning process. Agent 1 120-1 prunes the initial model 130-0 and generates model 1 130-1 which is a first intermediately pruned model. Agent 1 120-1 sends model 1 130-1 to agent 2 120-2. Receiving the first intermediately pruned model from agent 1 120-1, agent 2 120-2 prunes model 1 130-1 and generates model 2 130-2 which is a second intermediately pruned model. Agent 2 120-2 sends model 2 130-2 to a next agent (a third agent not shown in FIG. 1). In the serial sequence, each of agents after the first agent (agent 1 120-1) in the serial sequence receives from an immediately previous agent a model that has been pruned by the immediately previous agent in the serial sequence, and each of agents after the first agent (agent 1 120-1) prunes the model received. Each of agents prior to the final agent (agent N 120-N) in the serial sequence generates an intermediately pruned model (such as model 1 130-1 and model 2 130-2) for an immediately next agent in the serial sequence to prune. Each of agents prior to the final agent sends the intermediately pruned model to the immediately next agent. At the end of the serial sequence, agent N 120-N (final agent) receives the intermediately pruned model generated by (N−1)-th agent (not shown in FIG. 1) and prunes the model received. Agent N 120-N generates a finally pruned model 130-N. Agent N 120-N sends finally pruned model 130-N to the server 110. Thus, a cycle of the federated pruning process is completed. The server 110 determines whether further model pruning is needed or an iteration of the federated pruning process is needed. In response to determining that the iteration of the federated pruning process is needed, the server 110 uses the finally pruned model 130-N as a new initial model and sends the new initial model to agent 1 120-1 to start another cycle of the federated pruning process.

Figure 2:
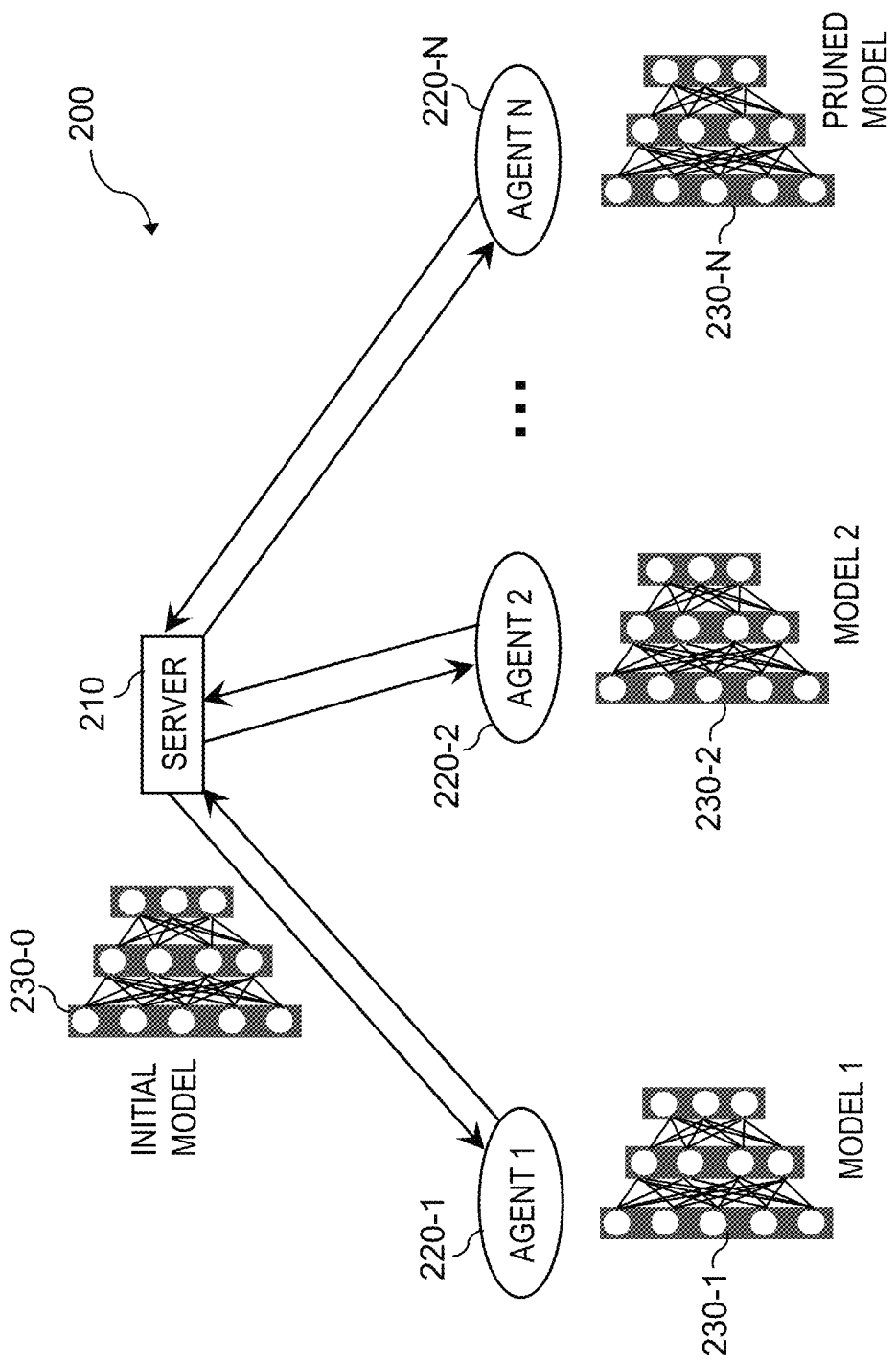
FIG. 2 is a systematic diagram illustrating a server-client architecture of incremental and decentralized pruning of a machine learning model in federated machine learning, in accordance with one embodiment of the present invention.

FIG. 2 is a systematic diagram illustrating a server-client architecture 200 of incremental and decentralized pruning of a machine learning model in federated machine learning, in accordance with one embodiment of the present invention. The server-client architecture 200 includes a server 210 in an environment of federated machine learning. The server-client architecture 200 further includes N agents (agent 1 220-1, agent 2 220-2, . . . , and agent N 220-N). For example, the agents are edge and mobile devices. The N agents are in a serial sequence of participating in model pruning by agents in a federated learning system. In the environment of federated machine learning, the server 210 sends an initial model 230-0 to agent 1 220-1 to start the federated pruning process. Agent 1 220-1 prunes the initial model 230-0 and generates model 1 230-1 which is a first intermediately pruned model. Agent 1 220-1 sends model 1 230-1 to the server 210. The server 210 sends model 1 230-1 to agent 2 220-2. Receiving the first intermediately pruned model from the server 210, agent 2 220-2 prunes the model 1 230-1 and generates model 2 230-2 which is a second intermediately pruned model. Agent 2 220-2 sends model 2 230-2 to the server 210. The server 210 sends model 2 230-2 to a next agent (a third agent not shown in FIG. 2). In the serial sequence, each of agents after the first agent (agent 1 220-1) in the serial sequence receives from the server 210 a model that has been pruned by an immediately previous agent in the serial sequence, and each of agents after the first agent prunes the model received. Each of agents prior to the final agent (agent N 220-N) in the serial sequence generates an intermediately pruned model (such as model 1 230-1 and model 2 230-2) for an immediately next agent in the serial sequence to prune. Each of agents prior to the final agent (agent N 220-N) sends the intermediately pruned model to the server 210. Then, the server 210 sends the intermediately pruned model to the immediately next agent in the serial sequence. At the end of the serial sequence, agent N 220-N (final agent) receives from the server 210 an intermediately pruned model generated by (N−1)-th agent (not shown in FIG. 1) and prunes the model received. Agent N 220-N generates a finally pruned model 230-N. Agent N 220-N sends finally pruned model 230-N to the server 210. Thus, a cycle of the federated pruning process is completed. The server 210 determines whether further model pruning is needed or an iteration of the federated pruning process is needed. In response to determining that the iteration of the federated pruning process is needed, the server 210 uses the finally pruned model 230-N as a new initial model and sends the new initial model to agent 1 220-1 to start another cycle of the federated pruning process.

The peer-to-peer architecture 100 may be implemented in a network that can be any combination of connections and protocols which support communications among server 110, agent 1 120-1, agent 2 120-2, . . . , and agent N (120-N). Similarly, the server-client architecture 200 may be implemented in a network that can be any combination of connections and protocols which support communications among server 210, agent 1 220-1, agent 2 220-2, . . . , and agent N (220-N). For example, the network may be the Internet which represents a worldwide collection of networks and gateways to support communications between devices connected to the Internet; the network may be implemented as an intranet, a local area network (LAN), a wide area network (WAN), and a wireless network. The peer-to-peer architecture 100 or the server-client architecture 200 may be implemented in a cloud computing environment. The cloud computing environment is described in later paragraphs with reference to FIG. 5 and FIG. 6.

In one embodiment, the server 110 or the server 210 may reside on a computing device. In another embodiment, the server 110 or the server 210 may reside on a virtual machine or another virtualization implementation. The virtual machine or the virtualization implementation runs on a computing device. The computing device is described in more detail in later paragraphs with reference to FIG. 4.

In one embodiment, a respective one of agent 1 (120-1), agent 2 (120-2), . . . , and agent N (120-N) or a respective one of agent 1 (220-1), agent 2 (220-2), . . . , and agent N (220-N) may reside on a computing device. The computing device may be any electronic device or computing system capable of receiving input from a user, executing computer program instructions, and communicating with another computing system via a network. The computing device is described in more detail in later paragraphs with reference to FIG. 4.

Figure 3:
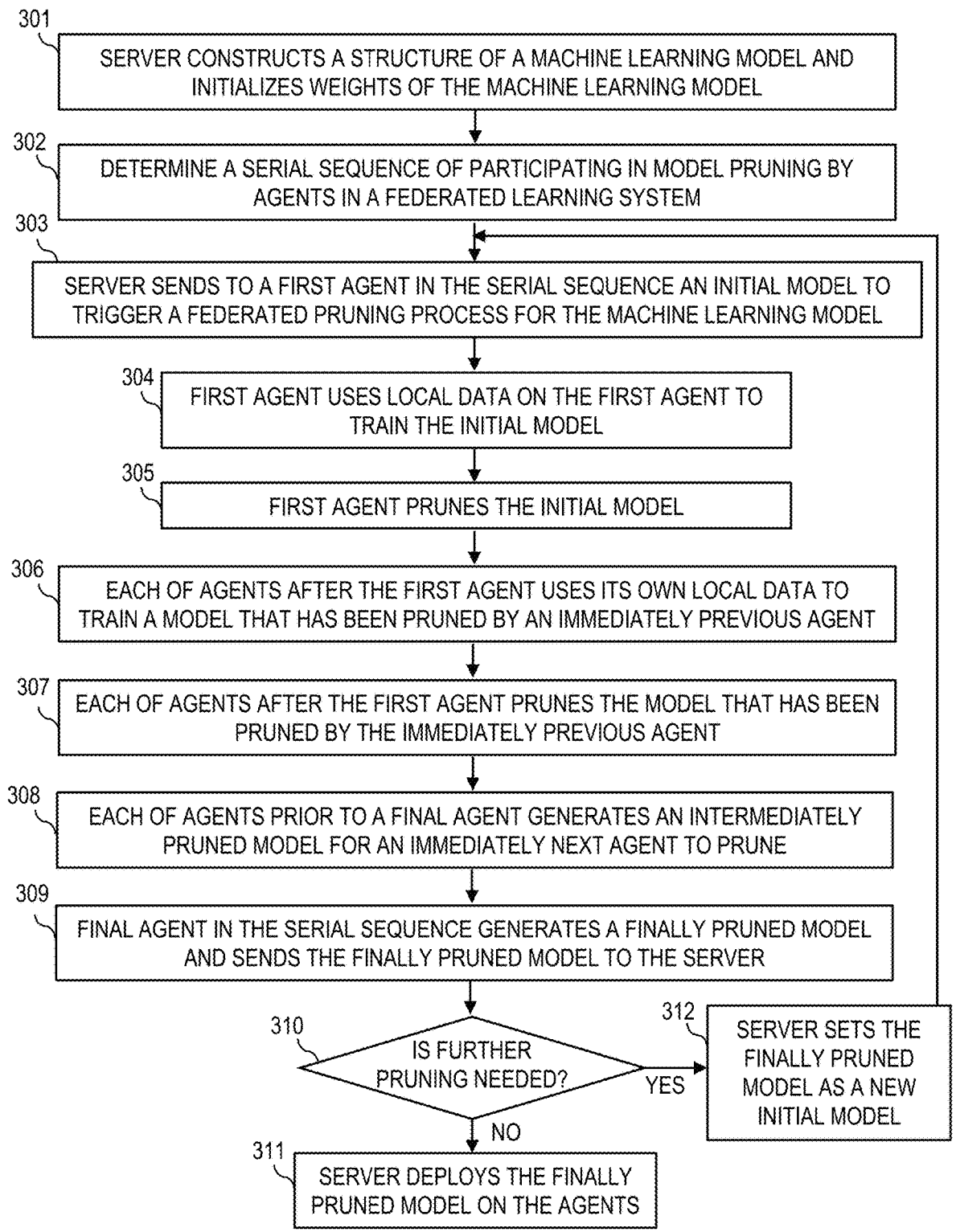
FIG. 3 present a flowchart showing operational steps of incremental and decentralized pruning of a machine learning model in federated machine learning, in accordance with one embodiment of the present invention.

FIG. 3 present a flowchart showing operational steps of incremental and decentralized pruning of a machine learning model in federated machine learning, in accordance with one embodiment of the present invention.

At step 301, a server (e.g., the server 110 shown in FIG. 1 or the server 210 shown in FIG. 2) in a federated learning system constructs a structure of a machine learning model and initializes weights of the machine learning model. The server constructs the structure of a neural network in machine learning and initializes weights of a neural network. The initialization of the weights may be in various forms, such as random initialization and variance scaling initialization.

Optionally, in one embodiment, the server may prune the model by removing certain smallest weights of the model (or neural network). This initial model pruning on the server is optional in the proposed method, which may serve as an additional step to reduce computation and/or communication cost for agents while enhancing the overall efficiency of the federated pruning process.

At step 302, the federated learning system determines a serial sequence of participating in model pruning by agents in the federated learning system. For example, as shown in FIG. 1, N agents are in the serial sequence: agent 1 120-1, agent 2 120-2, . . . , and agent N 120-N; as shown in FIG. 2, N agents are in the serial sequence: agent 1 220-1, agent 2 220-2, . . . , and agent N 220-N.

In one embodiment, the determination of the serial sequence is made by the server. In another embodiment, the determination of the serial sequence is made by agents using a consensus protocol. In the embodiment where the determination is made by the server, each agent sends some aggregated information about its data characteristics and resource availability or shares the aggregated information with the server. For example, such aggregated information may include a coreset of data, information about CPU load and available memory of the agent. The coreset of data is a small and representative subset of original data, which can be used for a machine learning task to reduce communication cost; it is used to determine which agent is selected in the federated pruning process. The information about CPU load and available memory is used to determine the serial sequence or determine which agent prunes the model prior to another agent. In the embodiment where the determination is made by agents using a consensus protocol, the aggregated information is shared among agents. The agents in the federated learning system likely have heterogeneous data and resources. Therefore, it is important to take heterogeneity into account, in determining a subset of agents and their sequence of participating in pruning.

At step 303, the server in the federated learning system sends to a first agent in the serial sequence an initial model to trigger a federated pruning process for the machine learning model. For example, shown in FIG. 1, the server 110 sends the initial model 130-0 to agent 1 120-1 (the first agent in the serial sequence); shown in FIG. 2, the server 210 sends the initial model 230-0 to agent 1 220-1 (the first agent in the serial sequence). In one embodiment, the initial model is the machine learning model constructed by the serve, without model pruning by the server. In another embodiment, the initial model has been initially pruned by the server before sending to the first agent for the federated pruning process.

At step 304, the first agent uses local data on the first agent to train the initial model. At step 305, the first agent prunes the initial model. For example, shown in FIG. 1, agent 1 120-1 uses local data on agent 1 120-1 to train the initial model 130-0 and prunes small weights in the initial model 130-0; shown in FIG. 2, agent 1 220-1 uses local data on agent 1 220-1 to train the initial model 230-0 and prunes the initial model 230-0 by removing small weights in the initial model 230-0. After the initial model is pruned by the first agent in the serial sequence and a first intermediately pruned model is generated for an immediately next agent (or the second agent) in the serial sequence to prune. For example, shown in FIG. 1, agent 1 120-1 generates model 1 130-1 (which is the first intermediately pruned model) for agent 2 120-2 to prune; shown in FIG. 2, agent 1 220-1 generates model 1 230-1 (which is the first intermediately pruned model) for agent 2 220-2 to prune.

At step 306, each of agents after the first agent in the serial sequence uses its own local date to train a model that has been pruned by an immediately previous agent. For example, as shown in FIG. 1, agent 2 120-2 uses local data on agent 2 120-2 to train model 1 130-1 that has been pruned by agent 1 120-1 (which is an immediately previous agent of agent 2 120-2); as shown in FIG. 2, agent 2 220-2 uses local data on agent 2 220-2 to train model 1 230-1 that has been pruned by agent 1 220-1 (which is an immediately previous agent of agent 2 220-2). In the federated pruning process, each agent uses its own local data to prune a machine learning model, thus maintaining high accuracy of a pruned model. At the same time, the privacy of each agent's local data is protected as well.

At step 307, each of the agents after the first agent in the serial sequence prunes the model that has been pruned by the immediately previous agent. The model pruning is implemented by removing certain small weights. For example, as shown in FIG. 1, agent 2 120-2 prunes model 1 130-1 that has been pruned by agent 1 120-1; as shown in FIG. 2, agent 2 220-2 prunes model 1 230-1 that has been pruned by agent 1 220-1.

At step 308, each of agents prior to a final agent in the serial sequence generates an intermediately pruned model for an immediately next agent to prune. For example, as shown in FIG. 1, agent 1 120-1 generates model 1 130-1 (which is an intermediately pruned model) for the immediately next agent (agent 2 120-2) to prune, and agent 2 120-2 generates model 2 130-2 (which is an intermediately pruned model) for the immediately next agent (or a third agent in the serial sequence, not shown in FIG. 1) to prune; as shown in FIG. 2, agent 1 220-1 generates model 1 230-1 (which is an intermediately pruned model) for the immediately next agent (agent 2 220-2) to prune, and agent 2 220-2 generates model 2 230-2 (which is an intermediately pruned model) for the immediately next agent (or a third agent in the serial sequence, not shown in FIG. 2) to prune.

At step 309, the final agent in the serial sequence generates a finally pruned model and sends the finally pruned model to the server. For example, shown in FIG. 1, agent N 120-N generates a finally pruned model 130-N and sends the finally pruned model 130-N to the server 110; shown in FIG. 2, agent N 220-N generates a finally pruned model 230-N and sends the finally pruned model 230-N to the server 210. To this point, a cycle of incremental and decentralized pruning of the machine learning model in federated machine learning is completed.

At step 310, the server determines whether further model pruning is needed. In response to determining that further model pruning is needed (YES branch of step 310), at step 312, the server sets the finally pruned model as a new initial model and reiterates step 303-310. An iteration of the federated pruning process is started.

In response to determining that further model pruning is not needed (NO branch of step 310), at step 311, the server deploys the finally pruned model on the agents. The server distributes the finally pruned model to the agents to start a normal federated learning process. The agents are participants of the federated pruning process. For example, as shown in FIG. 1, the participating agents includes agent 1 120-1, agent 2 120-2, . . . , and agent N 120-N in the peer-to-peer architecture 100; as shown in FIG. 2, the participating agents includes agent 1 220-1, agent 2 220-2, . . . , and agent N 220-N in the server-client architecture 200. The server may also deploy the finally pruned model on agents that have not been selected as the participating agents and have not participated in the federated pruning process.

In addition, agents with different datasets may suggest different pruning decisions, and decisions on which weights should be pruned may need to be made jointly by considering the decisions of multiple agents. In the federated pruning process, when two agents provide significantly different pruning decisions (e.g., one agent proposes to prune a certain weight and another agent proposes that this weight should be kept and another weight should be pruned instead), copies of both decisions may be kept and the final pruning decision is made using a consensus mechanism by considering the pruning decisions of all agents.

Three experiments were conducted with a dataset: MNIST database (Modified National Institute of Standards and Technology database) which is a large database of handwritten digits that is commonly used for training various image processing systems. All the three experiments started with a same full model without pruning. In a first experiment, the full model was trained with 10 epochs and there was no pruning process. In the second experiment, the proposed incremental and decentralized pruning was applied with 4 agents. In a second experiment, the proposed method of the present invention was used to prune the full model; after the full model was pruned to 1% of the full model by the proposed method, the pruned model was trained for 10 epochs. In a third experiment, the full model was pruned by a previous pruning method—pruning at a sever without using the proposed method of the present invention; the full model was directly pruned to 1% of the full model (by removing the smallest weights), and then the pruned model was trained for 10 epochs.

The accuracy is evaluated by analyzing test data. The accuracy of the first experiment (without pruning as a benchmark) was 99.17%. The accuracy of the second experiment (pruning with the proposed method of the present invention) was 96.72%. The accuracy of the third experiment (pruning with the prior method and without the proposed method of the present invention) was 73.72%. It was found that, by comparing the result of the first experiment and the result of the second experiment, the pruned model obtained from the proposed method of the present invention had comparable accuracy to the full model. It was also found that, by comparing the result of the second experiment and the result of the third experiment, the accuracy of the pruned model obtained from the proposed method of the present invention significantly outperformed the previous pruning method.

Figure 4:
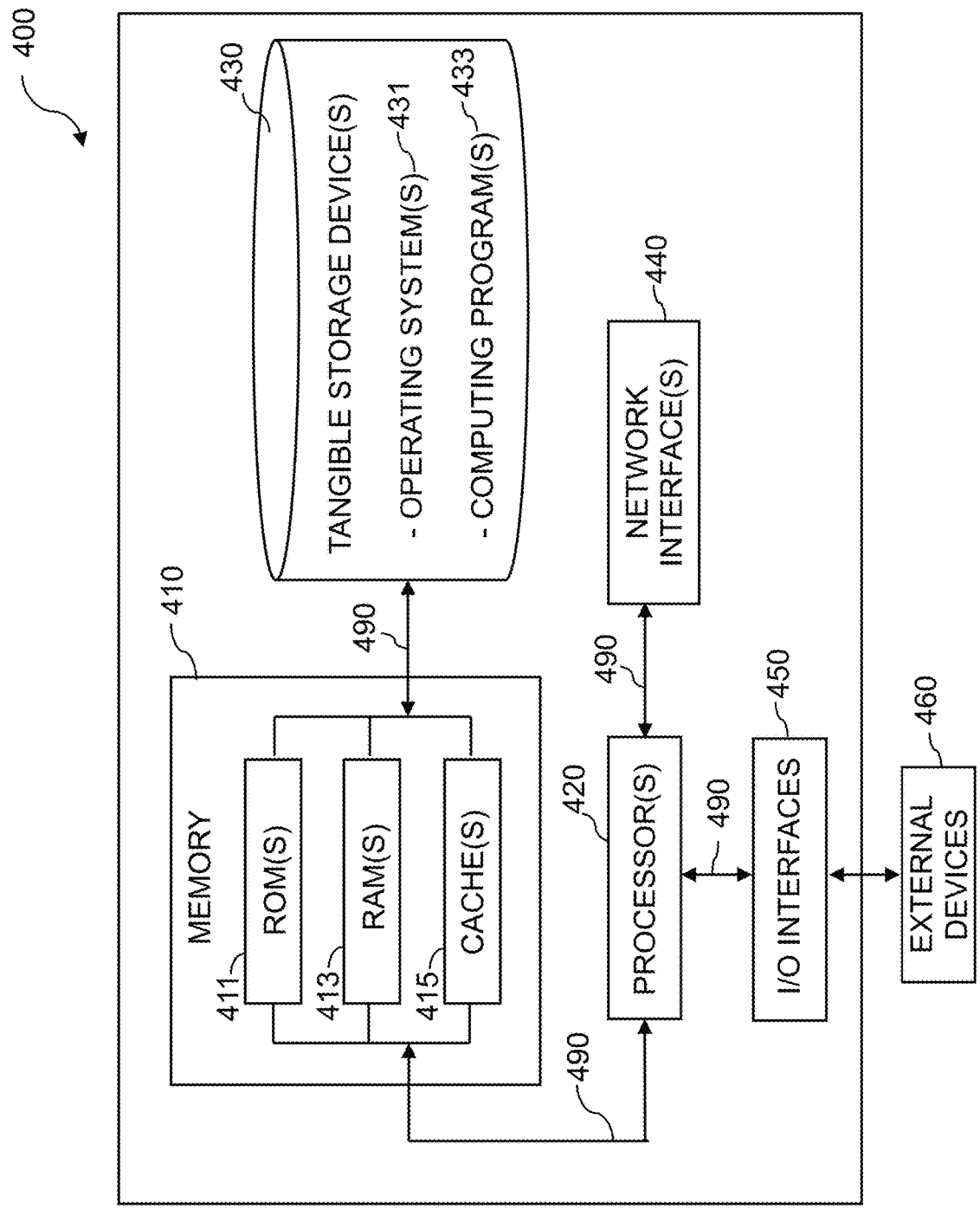
FIG. 4 is a diagram illustrating components of a computing device or server, in accordance with one embodiment of the present invention.

FIG. 4 is a diagram illustrating components of a computing device or server, in accordance with one embodiment of the present invention. It should be appreciated that FIG. 4 provides only an illustration of one implementation and does not imply any limitations with regard to the environment in which different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
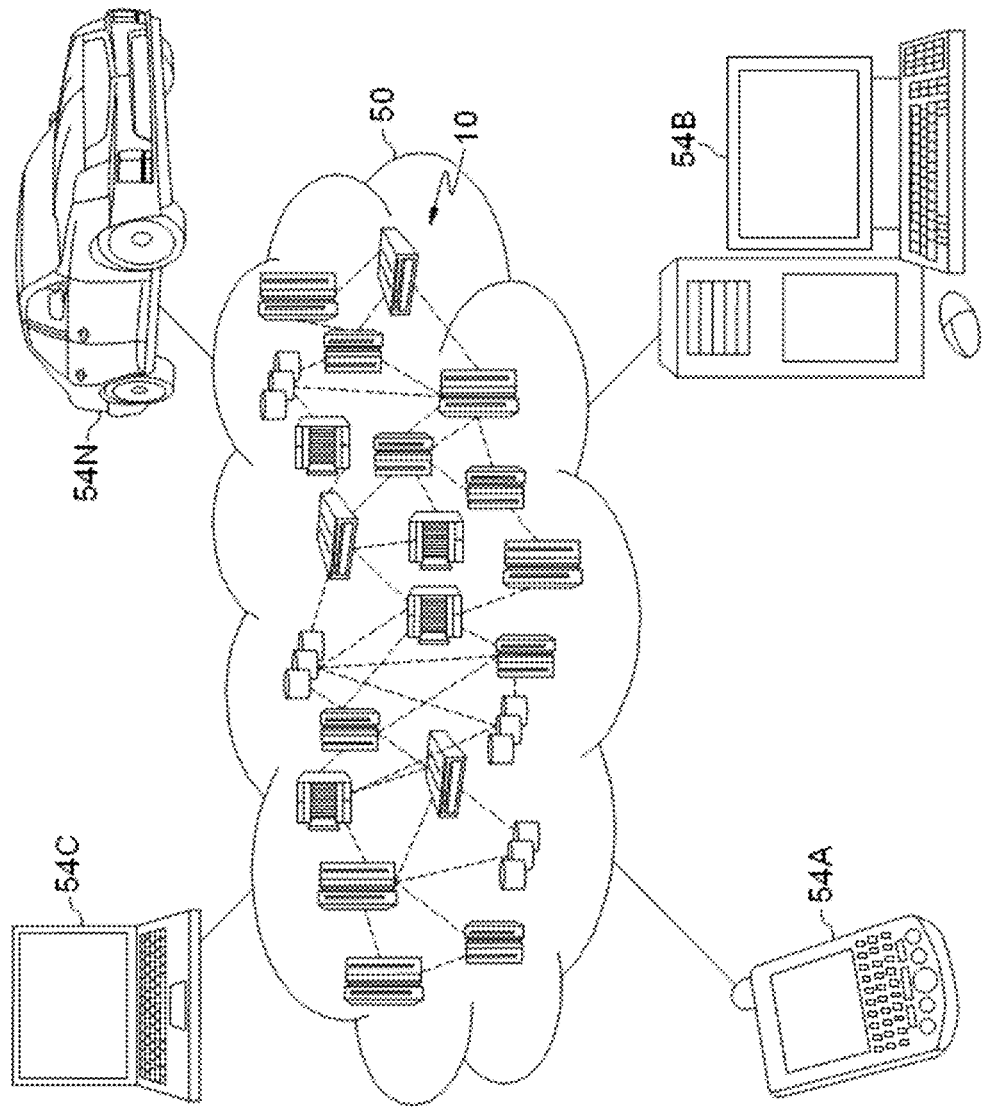
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
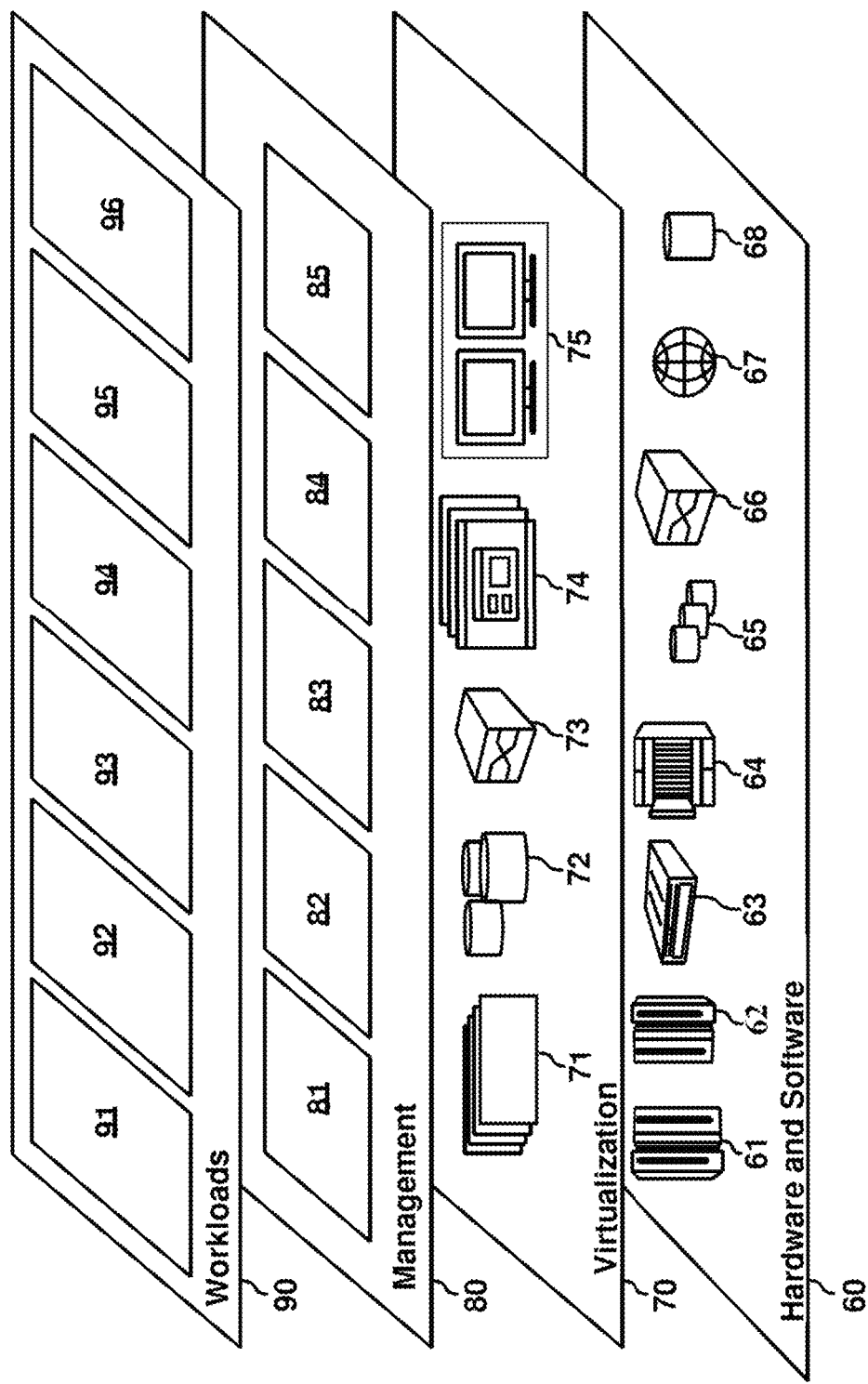
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of incremental and decentralized pruning of a machine learning model in federated learning.

What is claimed is:

1. A computer-implemented method for incremental and decentralized pruning of a machine learning model in federated learning, the method comprising:

determining, by a federated learning system, a serial sequence of participating in model pruning by agents in the federated learning system, wherein the agents are geo-distributed edge devices or geo-distributed mobile devices;

sending, by a server in the federated learning system, to a first agent in the serial sequence, an initial model to trigger a serial federated pruning process for the machine learning model, wherein the server initializes weights of the initial model, wherein the serial federated pruning process comprises steps:

(1) pruning, by the first agent, the initial model and generating a first intermediately pruned model, wherein the first agent removes a predetermined number of smallest weights of the initial model;

(2) pruning, by a respective one of agents after the first agent and prior to a final agent in the serial sequence, an intermediately pruned model that has been pruned by an agent immediately before the respective one of the agents, wherein the respective one of the agents removes a predetermined number of smallest weights of the intermediately pruned model that has been pruned by the agent immediately before the respective one of the agents;

(3) generating, by the respective one of the agents, an intermediately pruned model that is to be pruned by an agent immediately after the respective one of the agents, wherein steps (2) and (3) are executed for each of the agents after the first agent and prior to the final agent;

(4) pruning, by the final agent, an intermediately pruned model that has been pruned by an agent immediately prior to the final agent, wherein the final agent removes a predetermined number of smallest weights of the intermediately pruned model that has been pruned by the agent immediately prior to the final agent;
(5) generating, by the final agent, a finally pruned model; and
(6) sending, by the final agent, to the server, the finally pruned model;
determining, by the server, whether an iteration of the serial federated pruning process is needed, in response to the server receiving the finally pruned model; and
deploying, by the server, the finally pruned model on all the agents in the federated learning system, in response to determining that the iteration of the serial federated pruning process is not needed.

2. The computer-implemented method of claim 1, further comprising:
setting, by the server, the finally pruned model as a new initial model for reiterating the steps of the serial federated pruning process, in response to determining that the iteration of the serial federated pruning process is needed.

3. The computer-implemented method of claim 1, further comprising:
constructing, by the server, a structure of the initial model;
using, by the first agent, local data on the first agent to remove the predetermined number of the smallest weights of the initial model;
using, by each respective one of the agents after the first agent and prior to the final agent in the serial sequence, local data on each respective one of the agents to remove the predetermined number of the smallest weights of the intermediately pruned model that has been pruned by the agent immediately before each respective one of the agents; and
using, by the final agent, local data on the final agent to remove the predetermined number of the smallest weights of the intermediately pruned model that has been pruned by the agent immediately prior to the final agent.

4. The computer-implemented method of claim 1, further comprising:
sending, by a preceding agent in the serial sequence, to a succeeding agent which is immediately after the preceding agent, an intermediately pruned model that is to be pruned by the succeeding agent.

5. The computer-implemented method of claim 1, further comprising:
sending to the server, by a preceding agent in the serial sequence, an intermediately pruned model that is to be pruned by a succeeding agent, wherein the succeeding agent is immediately after the preceding agent; and
sending, by the server, to the succeeding agent, the intermediately pruned model that is to be pruned by the succeeding agent.

6. The computer-implemented method of claim 1, wherein the serial sequence of participating in model pruning by the agents is determined by the server, based on information shared between the server and each of the agents.

7. The computer-implemented method of claim 1, wherein the serial sequence of participating in model pruning by the agents is determined by the agents through a consensus protocol, based on information shared among the agents.

8. A computer program product for incremental and decentralized pruning of a machine learning model in federated learning, the computer program product comprising a computer readable storage medium having program instructions embodied therewith, the program instructions executable by one or more processors, the program instructions executable to:
determine, by a federated learning system, a serial sequence of participating in model pruning by agents in the federated learning system, wherein the agents are geo-distributed edge devices or geo-distributed mobile devices;
send, by a server in the federated learning system, to a first agent in the serial sequence, an initial model to trigger a serial federated pruning process for the machine learning model, wherein the server initializes weights of the initial model, wherein the serial federated pruning process comprises steps:
(1) prune, by the first agent, the initial model and generate a first intermediately pruned model, wherein the first agent removes a predetermined number of smallest weights of the initial model;
(2) prune, by a respective one of agents after the first agent and prior to a final agent in the serial sequence, an intermediately pruned model that has been pruned by an agent immediately before the respective one of the agents, wherein the respective one of the agents removes a predetermined number of smallest weights of the intermediately pruned model that has been pruned by the agent immediately before the respective one of the agents;
(3) generate, by the respective one of the agents, an intermediately pruned model that is to be pruned by an agent immediately after the respective one of the agents, wherein steps (2) and (3) are executed for each of the agents after the first agent and prior to the final agent;
(4) prune, by the final agent, an intermediately pruned model that has been pruned by an agent immediately prior to the final agent, wherein the final agent removes a predetermined number of smallest weights of the intermediately pruned model that has been pruned by the agent immediately prior to the final agent;
(5) generate, by the final agent, a finally pruned model; and
(6) send, by the final agent, to the server, the finally pruned model;
determine, by the server, whether an iteration of the serial federated pruning process is needed, in response to the server receiving the finally pruned model; and
deploy, by the server, the finally pruned model on all the agents in the federated learning system, in response to determining that the iteration of the serial federated pruning process is not needed.

9. The computer program product of claim 8, further comprising the program instructions executable to:
set, by the server, the finally pruned model as a new initial model for reiterating the steps of the serial federated pruning process, in response to determining that the iteration of the serial federated pruning process is needed.

10. The computer program product of claim 8, further comprising the program instructions executable to:
construct, by the server, a structure of the initial model;
use, by the first agent, local data on the first agent to remove the predetermined number of the smallest weights of the initial model;

use, by each respective one of the agents after the first agent and prior to the final agent in the serial sequence, local data on each respective one of the agents to remove the predetermined number of the smallest weights of the intermediately pruned model that has been pruned by the agent immediately before each respective one of the agents; and use, by the final agent, local data on the final agent to remove the predetermined number of the smallest weights of the intermediately pruned model that has been pruned by the agent immediately prior to the final agent.

11. The computer program product of claim 8, further comprising the program instructions executable to:

send, by a preceding agent in the serial sequence, to a succeeding agent which is immediately after the preceding agent, an intermediately pruned model that is to be pruned by the succeeding agent.

12. The computer program product of claim 8, further comprising program instructions executable to:

send to the server, by a preceding agent in the serial sequence, an intermediately pruned model that is to be pruned by a succeeding agent, wherein the succeeding agent is immediately after the preceding agent; and send, by the server, to the succeeding agent, the intermediately pruned model that is to be pruned by the succeeding agent.

13. The computer program product of claim 8, wherein the serial sequence of participating in model pruning by the agents is determined by the server, based on information shared between the server and each of the agents.

14. The computer program product of claim 8, wherein the serial sequence of participating in model pruning by the agents is determined by the agents through a consensus protocol, based on information shared among the agents.

15. A computer system for incremental and decentralized pruning of a machine learning model in federated learning, the computer system comprising one or more processors, one or more computer readable tangible storage devices, and program instructions stored on at least one of the one or more computer readable tangible storage devices for execution by at least one of the one or more processors, the program instructions executable to:

determine, by a federated learning system, a serial sequence of participating in model pruning by agents in the federated learning system, wherein the agents are geo-distributed edge devices or geo-distributed mobile devices;

send, by a server in the federated learning system, to a first agent in the serial sequence, an initial model to trigger a serial federated pruning process for the machine learning model, wherein the server initializes weights of the initial model, wherein the serial federated pruning process comprises steps:

(1) prune, by the first agent, the initial model and generate a first intermediately pruned model, wherein the first agent removes a predetermined number of smallest weights of the initial model;

(2) prune, by a respective one of agents after the first agent and prior to a final agent in the serial sequence, an intermediately pruned model that has been pruned by an agent immediately before the respective one of the agents, wherein the respective one of the agents removes a predetermined number of smallest weights of the intermediately pruned model that has been pruned by the agent immediately before the respective one of the agents;

(3) generate, by the respective one of the agents, an intermediately pruned model that is to be pruned by an agent immediately after the respective one of the agents, wherein steps (2) and (3) are executed for each of the agents after the first agent and prior to the final agent;

(4) prune, by the final agent, an intermediately pruned model that has been pruned by an agent immediately prior to the final agent, wherein the final agent removes a predetermined number of smallest weights of the intermediately pruned model that has been pruned by the agent immediately prior to the final agent;

(5) generate, by the final agent, a finally pruned model; and (6) send, by the final agent, to the server, the finally pruned model;

determine, by the server, whether an iteration of the serial federated pruning process is needed, in response to the server receiving the finally pruned model; and deploy, by the server, the finally pruned model on all the agents in the federated learning system, in response to determining that the iteration of the serial federated pruning process is not needed.

16. The computer system of claim 15, further comprising the program instructions executable to:

set, by the server, the finally pruned model as a new initial model for reiterating the steps of the serial federated pruning process, in response to determining that the iteration of the serial federated pruning process is needed.

17. The computer system of claim 15, further comprising the program instructions executable to:

send, by a preceding agent in the serial sequence, to a succeeding agent which is immediately after the preceding agent, an intermediately pruned model that is to be pruned by the succeeding agent.

18. The computer system of claim 15, further comprising the program instructions executable to:

send to the server, by a preceding agent in the serial sequence, an intermediately pruned model that is to be pruned by a succeeding agent, wherein the succeeding agent is immediately after the preceding agent; and send, by the server, to the succeeding agent, the intermediately pruned model that is to be pruned by the succeeding agent.

19. The computer system of claim 15, wherein the serial sequence of participating in model pruning by the agents is determined by the server, based on information shared between the server and each of the agents.

20. The computer system of claim 15, wherein the serial sequence of participating in model pruning by the agents is determined by the agents through a consensus protocol, based on information shared among the agents.

* * * * *